United States Patent
Yamaguchi et al.

(10) Patent No.: US 7,092,610 B2
(45) Date of Patent: Aug. 15, 2006

(54) OPTICAL FIBER FOR ATTENUATING OPTICAL SIGNAL

(75) Inventors: Masamitsu Yamaguchi, Kawasaki (JP); Gen Tanimoto, Kawasaki (JP); Kentaro Nouchi, Kawasaki (JP); Yuichi Morishita, Kawasaki (JP); Eiji Matsuyama, Kawasaki (JP)

(73) Assignee: Showa Electric Wire & Cable Co. Ltd., Kanagawa (JP)

( * ) Notice: Subject to any disclaimer, the term of this patent is extended or adjusted under 35 U.S.C. 154(b) by 264 days.

(21) Appl. No.: 10/717,498

(22) Filed: Nov. 21, 2003

(65) Prior Publication Data

US 2004/0114903 A1    Jun. 17, 2004

(30) Foreign Application Priority Data

Nov. 27, 2002   (JP)   ............................. 2002-343222

(51) Int. Cl.
*G02B 6/18* (2006.01)
*G02B 6/16* (2006.01)

(52) U.S. Cl. .................. 385/140; 385/123; 385/141
(58) Field of Classification Search .............. 385/140
See application file for complete search history.

(56) References Cited

U.S. PATENT DOCUMENTS

| | | | | |
|---|---|---|---|---|
| 5,572,618 A | * | 11/1996 | DiGiovanni et al. | 385/140 |
| 5,633,974 A | * | 5/1997 | Chia | 385/140 |
| 5,841,926 A | * | 11/1998 | Takeuchi et al. | 385/123 |
| 6,498,888 B1 | * | 12/2002 | Chenard et al. | 385/127 |
| 6,748,151 B1 | * | 6/2004 | Watanabe et al. | 385/124 |
| 6,757,473 B1 | * | 6/2004 | Han et al. | 385/142 |

* cited by examiner

*Primary Examiner*—Michelle Connelly-Cushwa
(74) *Attorney, Agent, or Firm*—Jeffrey S Melcher; Manelli Dension & Selter, PLLC

(57) ABSTRACT

In order to supply the optical fiber for attenuating optical signal enable the attenuation amount to become flat in wide wavelength scope, simultaneously adding at least two kinds of dopants for attenuating optical signal over the core and the cladding of the optical fiber. Then, properly adjusting the kind and the concentration of dopants for manufacturing the optical fiber 1 for attenuating optical signal; simultaneously adding the dopant enabling the absorption of optical signal to increase with the wavelength become long and the dopant enabling the absorption of optical signal to decrease with the wavelength become long. As the dopant, it is desired to select at least two kinds of transitional metals from Co, Ni, Cr, V, Fe, Mn, Tb and Tm. Further, as the doped area, it is desired to dope the 6 times of the center portion of the core from the center of the core.

23 Claims, 4 Drawing Sheets

| λ | amount of attenuation dB/m/ppm | | | | | |
|---|---|---|---|---|---|---|
| | Mn | Ni | Cr | V | Co | Fe |
| 1310nm | 0.07 | 0.18 | 0.73 | 0.48 | 0.45 | 0.13 |
| 1550nm | 0.06 | 0.26 | 0.74 | 0.22 | 0.57 | 0.10 |

λ : wave length

OPTICAL FIBER FOR ATTENUATING OPTICAL SIGNAL

This application claims priority to Japanese Patent Application No. 2002-343222, filed on Nov. 27, 2002, the complete disclosure of which is incorporated herein by reference.

BACKGROUND OF THE INVENTION

1. Field of the Invention

The present invention relates to an optical fiber for attenuating optical signals, which is used in an optical attenuator, optical terminal device or the like.

2. Description of the Related Art

In recent years, optical fiber communication networks have made rapid progress. In the optical fiber communication network, a variety of optical devices are used.

As one of the optical devices, there is an optical fixed attenuator, which is used to positively attenuate optical signals and adjust the light power level in the optical fiber communication network into proper scope.

Further, as another of the optical devices, there is an optical terminal device, which is used to reflect the input light in the output side and make the reflected light return, then attenuate the light having returned, for removing the influence of unnecessary optical signal.

In these optical devices, generally, optical fiber for attenuating optical signals is used. The optical fiber for attenuating optical signals has a core formed from quartz glass, which has a higher refractive index by doping with Ge (germanium). In the core, Co (cobalt) is contained as a dopant (doped material) to positively attenuate optical signal.

Moreover, in a WDM (Wavelength Division Multiplexer) network, the optical fixed attenuator or the optical terminal device is needed. In the WDM network system, there are many kinds of wavelengths with respect to various transmitted light signals, and the attenuation amount of the optical fixed attenuator or the optical terminal device must correspond to any one of the wavelengths.

Therefor, the optical fiber for attenuating optical signals used in the optical fixed attenuator or the optical terminal device, it is desired to obtain the same attenuation amount, not only corresponding to the optical signal having the wavelength of 1310 nm or 1550 nm, but also corresponding to the optical signals having wider wavelength scopes.

Conventionally, in order to obtain such fiber for attenuating optical signal, whose light attenuation amount is constant, there is a method described in Japanese Patent publication 8-136736. This method uses a characteristic that mode field diameter (MFD) depends upon the wavelength of the transmitted optical signal, and adds dopant to a narrow area in core, then provides an appropriate construction.

However, in the conventional art, there are some problems that need to be solved. That is, Co is a dopant used in the optical fiber for attenuating optical signal as usual. As a characteristic of the Co, the longer the wavelength of optical signal, the greater the Co absorbs the optical signal. Because the dopant absorbs the optical signal, the optical signal is attenuated. By using the Co having such characteristic and adding it to core, the optical fiber for attenuating optical signal is formed, which can obtain stable attenuation amount with respect to various optical signals having various wavelengths. Thus, as stated above, it is possible to use a characteristic depending upon the wavelength of optical signal transmitted by mode field diameter (MFD), to add dopant to the narrow area in core, and to provide an appropriate construction.

However, when using such a method, which adds dopant to the narrow area in core, the passage of the optical signal becomes narrow. Therefore, in order to obtain the desired attenuation amount, it is necessary to improve the concentration of the Co. In the case, when using a method called sinking method, it is difficult to add Co at a higher concentration.

SUMMARY OF THE INVENTION

To solve the conventional problems as mentioned above, the present invention provides an optical fiber for attenuating optical signal, which can provide the same attenuation amount with respect to various optical signals corresponding to wide wavelength scope.

According to the present invention, there is provided an optical fiber for attenuating optical signal, including a core and a cladding wherein n ($n \geq 2$) kinds of dopants are added for attenuating optical signal, wherein the concentration $W_j$ ($j=1, 2, 3, \ldots, n$) is adjusted, with respect to wavelength $\lambda_i$ ($i=1, 2, \ldots, m; m \geq 2$), as meeting the following expressions 1 and 2.

Expression 1:

$$0.9 < \frac{\alpha(\lambda_i)}{\alpha(\lambda_k)} < 1.1 \, (k = 1, 2, \cdots, m) \text{ AND } (k \neq i)$$

Expression 2:

$$\alpha(\lambda_i) = \sum_{j=1}^{n} W_j A_j(\lambda_i)$$

$\lambda_i$, is a wavelength of optical signal used in optical communication system;

$\alpha(\lambda_i)$, is an attenuation amount of fiber for attenuating optical signal with respect to optical signal with wavelength $\lambda_i$ in dB;

K is a positive integral number;

$W_j$ is a concentration of dopant j;

$A_j(\lambda_i)$ is an attenuation of fiber for attenuating optical signal with respect to the optical signal with wavelength $\lambda_i$, which is produced by the dopant j of one unit.

In the optical fiber for attenuating optical signal, the dopant preferably comprises at least two kinds of transitional metals selected from Co, Ni, Cr, V, Fe, Mn, Tb and Tm.

Further, in the optical fiber for attenuating optical signals, the doped area the dopant is doped in the cladding is preferably about six times the area of the core around the core as a center. The diameter of doped area is preferably about six times the diameter of the core.

Moreover, in the optical fiber for attenuating optical signal, the wavelength $\lambda_i$ of optical signal is preferably in the range of 1200–1700 nm. In this case, the wavelengths $\lambda_i$ of optical signal, for example, may be 1310 nm and 1550 nm.

Furthermore, the optical fiber for attenuating optical signal, with respect to the wavelengths $\lambda_i$ of optical signal, preferably operates in single mode.

Further, in the optical fiber for attenuating optical signal, the distribution of the dopant in the doped area is preferably not uniform along the radius direction of the optical fiber.

Moreover, in the optical fiber for attenuating optical signal, the dopant enabling the absorption of optical signal to increase as the wavelength becomes longer, and the dopant enabling the absorption of optical signal to decrease as the wavelength becomes longer, are preferably simultaneously added.

BRIEF DESCRIPTION OF THE DRAWINGS

The above and other objects, advantages and features of the present invention will be more apparent from the following description taken in conjunction with the accompanying drawings in which.

DESCRIPTION OF THE PREFERRED EMBODIMENTS

Best modes of carrying out the present invention will be described in further detail using various embodiments with references to the accompanying drawing without being limited thereto.

Next, details explain the embodiments regarding implementation aspects.

Figure 1A:
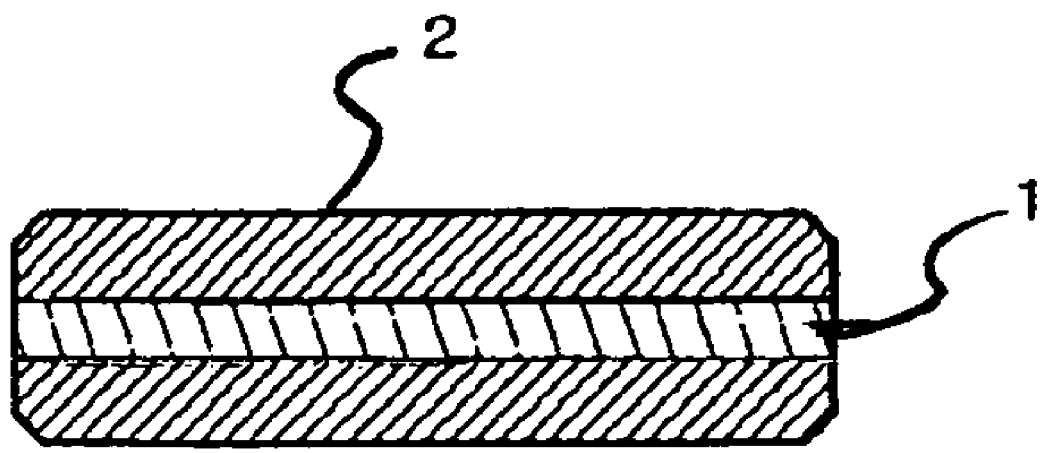
FIGS. 1a and 1b show a longitudinal section and a cross section showing a state that fiber for attenuating optical signal of the present invention is inserted into a ferrule.
Figure 1B:
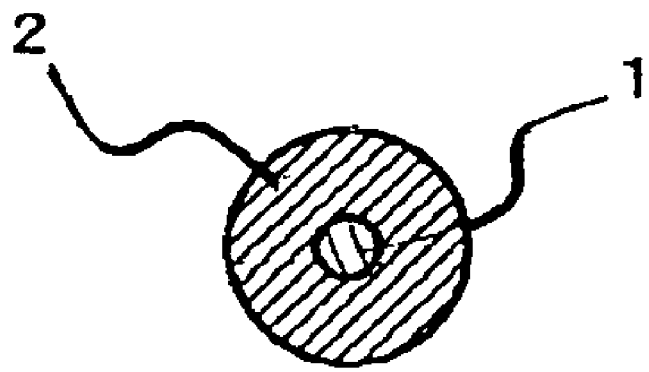

FIGS. 1a and 1b show an example of an optical attenuator or optical terminal device, in which the optical fiber for attenuating optical signal is placed in a ferrule.

FIG. 1a is a longitudinal section showing a part of an optical attenuator or optical terminal device. FIG. 1b is a cross section showing a part of an optical attenuator or optical terminal device.

In FIGS. 1a and 1b, 1 is a fiber for attenuating optical signal of the present invention, in which the core is doped by a dopant for attenuating an optical signal. Serving as the optical fiber for attenuating optical signal 1, in general, a single mode fiber is used. The outside diameter of the optical fiber for attenuating optical signal 1 is 125 µm. The optical fiber for attenuating optical signal 1 is inserted into a ferrule 2 with an inside diameter of 126 µm, and is fixed with the ferrule 2 by adhesive. The optical fiber for attenuating optical signal 1 has a standard length of 22.4 mm. The ferrule 2, in which the optical fiber for attenuating optical signal 1 is inserted, is placed in a not shown optical connector, which forms a part of an optical attenuator or optical terminal device.

In present invention, preferably at least two kinds of dopant for attenuating optical signal are added simultaneously into the optical fiber (the meaning regarding the "added simultaneously" is that a plurality of dopants are added, i.e. doped), then it is possible to obtain approximately the same attenuation amount with respect to optical signals having different wavelengths in a wide wavelength scope.

Thus, the attenuation amounts of light having different wavelengths become flat. That is, if only adding simultaneously respective dopants for attenuating optical signal to optical fiber, such as meeting the conditions shown by the following expressions, the above-stated object can be reached.

$$0.9 < \frac{\alpha(\lambda_i)}{\alpha(\lambda_k)} < 1.1 \ (K = 1, 2, \ldots, m) \text{ and } (k \neq i) \quad \text{[Expression 1]}$$

The expression 1 means that: with respect to any one of m kinds of optical signals that are actually transmitted in optical fiber and have respective wavelengths, the unevenness of attenuation amount is in the range of 0.9~1.1 dB. $\lambda$ i is a wavelength of optical signal used in optical communication system; $\alpha$ ($\lambda$ i) is an attenuation amount of fiber for attenuating optical signal with respect to optical signal with wavelength $\lambda$ i, its unit is dB. the denominator a ($\lambda$ k) is a object for comparing, indicates a attenuation amount with respect to optical signals with all other wavelengths.

$$\alpha(\lambda_i) = \sum_{j=1}^{n} w_j A_j(\lambda_i) \quad \text{[Expression 2]}$$

The expression 2 indicates that with respect to one optical signal having any wavelength, its attenuation amount is the sum total produced by all dopants added in optical fiber. Wj is a concentration of dopant j; its unit is weight %. Aj($\lambda$ i) is an attenuation of fiber for attenuating optical signal with respect to the optical signal with wavelength $\lambda$ i, which is produced by the dopant j of one unit. Therefore, Wj Aj($\lambda$ i) indicates a total attenuation amount of the optical fiber for attenuating optical signal with respect to the optical signal having wavelength $\lambda$ i, which is produced by the dopant j. Because there are n dopants being added, at the right side of the expression 2, the attenuation amount, produced by the n kinds of dopants, of the optical fiber for attenuating light with respect to the optical signal with wavelength .i, is attained.

Figures 2, 3:
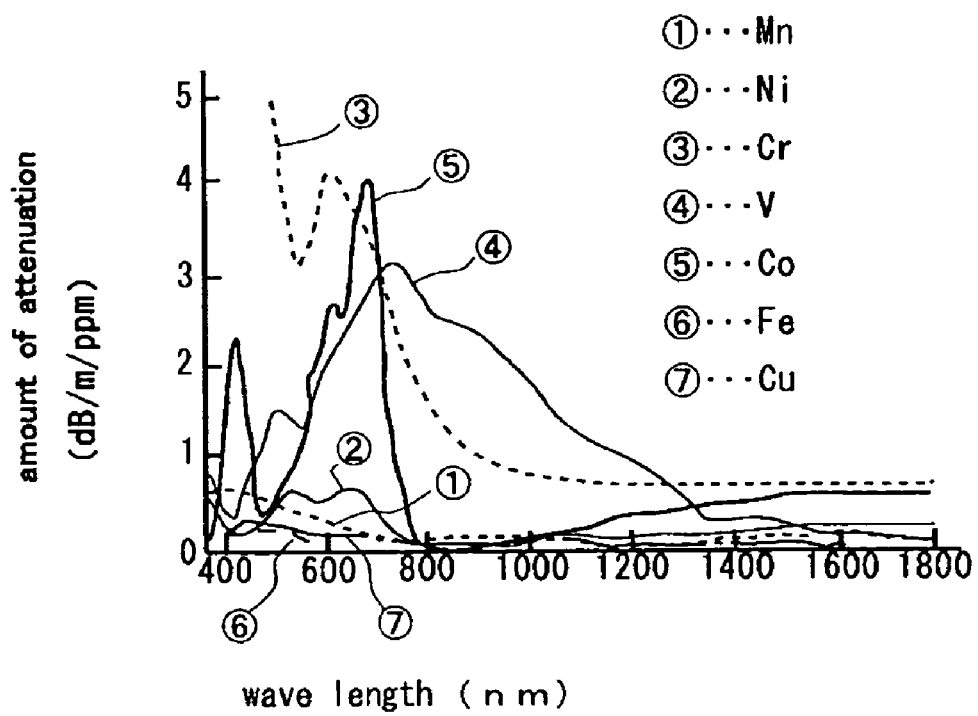
FIG. 2 is a graph showing the wavelength characteristic of dopant for attenuating optical signal.
FIG. 3 is an attenuation amount list showing the wavelength characteristic of dopant for attenuating optical signal.

FIG. 2 is a graph showing the wavelength characteristic of respective dopants for attenuating optical signals.

The dopants ①~⑦ for attenuating optical signal, as known from past, respectively have characteristics that the attenuation amounts of these optical signals are different corresponding to respective wavelengths. This data is obtained by respectively, uniformly adding dopants for attenuating optical signals into the whole core of the optical fiber along the length direction and the radius direction, and by manufacturing the optical fiber for attenuating optical signal on the same manufacturing conditions, then by measuring their absorption wavelength characteristic.

The refractive index ratio of core to cladding of the optical fiber is 0.3%. In the core of the optical fiber, Ge is doped as a dopant for improving refractive index. The cladding of the optical fiber is formed by pure quartz glass. The outside diameter of the core is 8 µm. The concentration of the dopant is set in 1000~10000 ppm. The concentration is such concentration enabling the optical signal attenuation amount is in 1~10 dB/cm.

FIG. 3 is an attenuation amount list showing the wavelength characteristic of dopant for attenuating optical signal. In FIG. 3, the optical signal attenuation amount is also shown when the dopant of 1 ppm for attenuating optical signal is added into the optical fiber having a length of 1 m, with respect to the optical signals with wavelengths 1310 nm and 1550 nm, mainly used in optical communication.

Further, on the one hand, it is known that transitional metal contained in glass exists in ion state. For example, V may be $V^{3+}$, $V^{4+}$, or $V^{5+}$; Cr may be $Cr^{3+}$, or $Cr^{6+}$; Mn may be $Mn^{2+}$, or $Mn^{3+}$; Fe may be $Fe^{2+}$, or $Fe^{3+}$; Co may be $Co^{2+}$, and Ni may be $Ni^{2+}$. In these, V, Cr, Mn and Fe exist in at least two kinds of ion states with different the number of valent. The ratio (in balance state) of the at least two kinds of ion states is influenced greatly by the atmosphere of manufacturing glass. The atmosphere can be an oxidation atmosphere, reduction atmosphere or the like. In general, if the glass is manufactured in the oxidation atmosphere, the ratio of the ion state having a small valent number will be increased; and if the glass is manufactured in the reduction atmosphere, the ratio of the ion state having a large valent number will be increased. When the number of valent of the transitional metal ion contained in glass changes, because the absorption wavelength characteristic of optical signal also changes, then the absorption wavelength characteristic of glass, including the transitional metal ion, is changed by the manufacturing atmosphere of the glass.

On the other hand, it is known that the arrangement states of the $Co^{2+}$, $Ni^{2+}$ and $Fe^{3+}$ depend upon the cooling speed of the glass. Because of the difference of arrangement states, with respect to the glass in which the transitional metal ion is added, its absorption wavelength characteristic of optical signal changes due to the different arrangement states. When the reduction speed of the optical fiber become different because the cooling speed, the absorption wavelength characteristic of optical signal changes. In view of the above various conditions, by selecting the conditions in which most proper transitional metals are combined, it is better to manufacture the optical fiber for attenuating optical signal. Moreover, in the optical fiber used in communication, because the optical signal is transmitted in single mode, the optical fiber for attenuating optical signal is desired to operate in single mode, with respect to the optical signal having a wavelength $\lambda$ i.

Further, the attenuation amount of the optical fiber for attenuating optical signal is influenced by the concentration distribution of the dopant for attenuating optical signal in optical fiber, and by the mode distribution of the optical signal transmitted in the optical fiber. If making the attenuation amount serve as a standard value, obtained in the case that the dopant is distributed over the whole of the core and the cladding of the optical fiber, in uniform concentration, when the dopant is distributed only over the center portion of the core, the attenuation amount of optical signal becomes small compared with the standard value. Further, when the scope the dopant is distributed becomes broad, the attenuation amount of optical signal becomes large compared with the standard value. When the dopant distributes over the area, which equals 6 times the center portion, from the center of the core, the attenuation amount of optical signal become approximately the standard value. Therefore, it is desired to uniformly distribute the dopant over the area equaling the 6 times of the center portion, from the center of the core.

Moreover, the mode distribution of the optical fiber (in particular, with respect to single mode fiber) is influenced by optical diffractive effect. Therefore, when the wavelength becomes longer, the mode distribution become broader. That is, the optical signals having various modes are transmitted in optical fiber. In the case that the dopant is distributed only over the center portion of the core, with the mode distribution spread out, the attenuation amount of all optical signals becomes smaller. In other words, depending upon the spreading manner of the mode distribution, the wavelength dependence characteristic is changed. The spreading manner of the mode distribution is greatly influenced by the refractive index distribution of the core and the cladding of the optical fiber. As a result, the refractive index distribution of the core and the cladding greatly influences the wavelength dependence characteristics.

In the above argument, there is a precondition that the dopant having the attenuation characteristic for optical signal is contained uniformly in the optical fiber. However, even if the concentration distribution of the dopant is not uniform by seeing along the radius direction of the optical fiber, with respect to the attenuation amount of optical signal, the wavelength characteristic occurs. That is, the concentration distribution of dopant is an important parameter of the design of the optical fiber for attenuating optical signal.

In the present invention, as stated above, though the wavelength characteristic of attenuation amount changes depending upon the concentration distribution of dopant, the refractive index distribution of core and cladding, and the like, either the concentration distribution of dopant, or the refractive index distribution of core and cladding, if only adding the dopant according to the conditions indicated by the above expressions 1 and 2, the object of the present invention can be reached. Therefore, it is possible to use an optical fiber wherein the concentration distribution of the dopant is not uniform along the radius direction of the optical fiber.

EMBODIMENTS

The following embodiments concretely demonstrate the effects of simultaneously adding several dopants for attenuating light to the optical fiber. In these embodiments, any fiber for attenuating optical signal is a single mode, and Ge is added in the optical fiber for improving the refractive index of core.

Embodiment 1

In this embodiment, the optical fiber for attenuating optical signal is manufactured by using V and Co serving as the dopant for attenuating optical signal.

Figure 4:
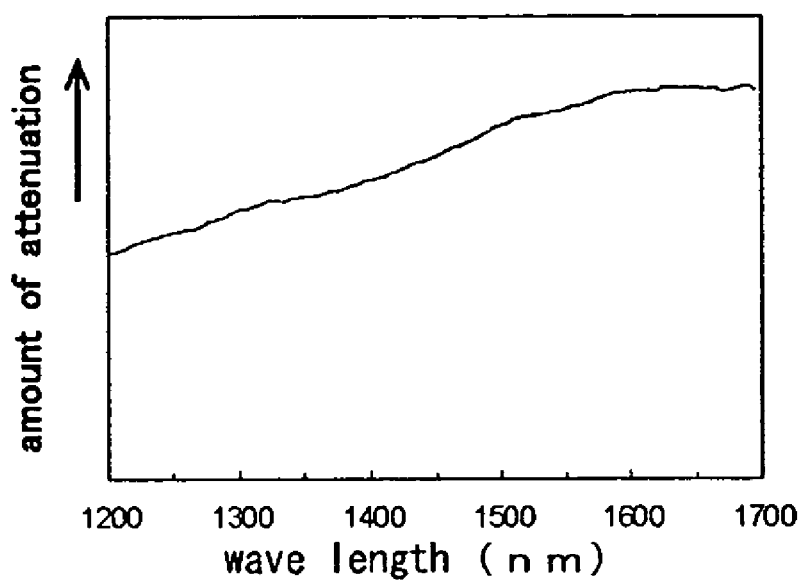
FIG. 4 is a graph showing wavelength characteristic of optical fiber doped only by Co, between wavelength and attenuation amount.
Figure 5:
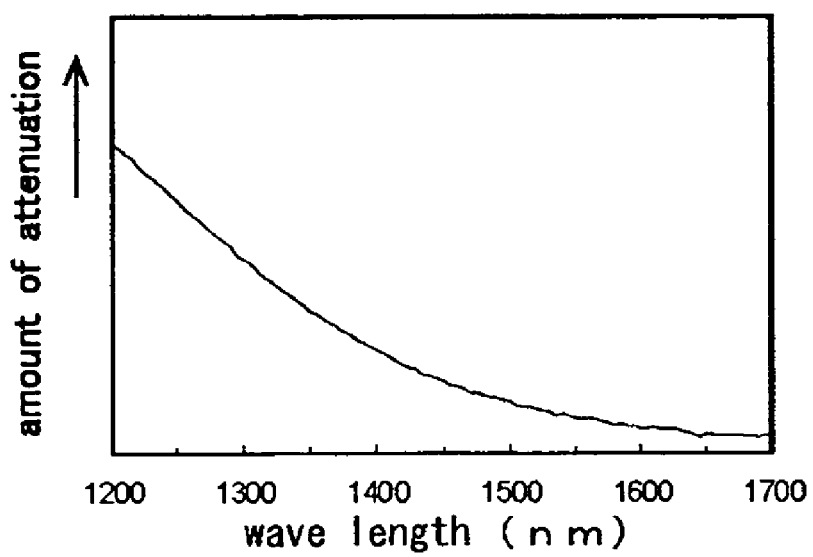
FIG. 5 is a graph showing wavelength characteristic of optical fiber doped only by V, between wavelength and attenuation amount.

FIG. 4 is a graph showing wavelength characteristic of optical fiber doped only by Co, between wavelength and attenuation amount. FIG. 5 is a graph showing wavelength characteristic of optical fiber doped only by V, between wavelength and attenuation amount. In these drawings, the vertical axis indicates the attenuation amount by any scale.

Figure 6:
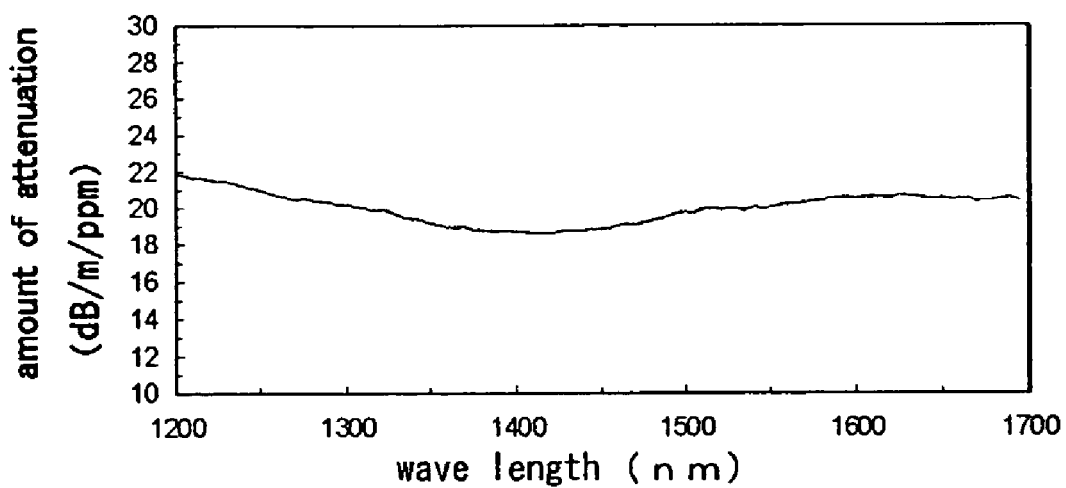
FIG. 6 is a graph showing wavelength characteristic of fiber for attenuating optical signal, between wavelength and attenuation amount.

Further, FIG. 6 is a graph showing wavelength characteristic of fiber for attenuating optical signal, between wavelength and attenuation amount, when V and Co are simultaneously added as dopants. In the FIG. 6, the vertical axis indicates the attenuation amount with respect to the optical fixed attenuator or the optical terminal device with a standard length of 22.4 mm. The weight ratio (V:Co) of V to Co is 1:3 when the V and the Co are simultaneously added. With respect to the optical signals having wavelengths 1310 nm and 1550 nm, the attenuation amount ratio (attenuation amount of 1310 nm optical signal/attenuation amount of 1550 nm optical signal) is 0.95.

With respect to the attenuation amount of optical fiber in FIGS. 4 and 5, the wavelength characteristic is not small. On the one hand, Co is such a dopant in that the longer the wavelength the greater the absorption of optical signal increases. On the other hand, V is such a dopant in that the longer the wavelength the more the absorption of the optical signal decreases.

Thus, in the optical fiber corresponding to the FIG. 6, the attenuation amount ratio is 0.9–1.1. In the optical fiber for attenuating optical signal of the embodiment, it is proved that the wavelength characteristic of attenuation amount is approximately flat. Therefore, when simultaneously adding the dopant making the absorption of optical signal increase as the wavelength becomes longer and the dopant making the absorption of optical signal decrease as the wavelength becomes longer, it is possible to make the wavelength characteristic of attenuation amount effectively become flat.

Embodiment 2

In this embodiment, the optical fiber for attenuating optical signal is manufactured by using Fe and Ni serving as the dopant for attenuating optical signal. The weight ratio (Fe:Ni) of Fe to Ni is 1:0.3 when the V and the Co are simultaneously added. With respect to the optical signals with wavelengths 1310 nm and 1550 nm, the attenuation amount ratio (attenuation amount of 1310 nm optical signal/attenuation amount of 1550 nm optical signal) is 1.03. In this embodiment, with respect to the optical fiber for attenuating optical signal, it is also proved that the wavelength characteristic of attenuation amount is approximately flat.

Embodiment 3

In this embodiment, the optical fiber for attenuating optical signal is manufactured by using Fe and Co serving as the dopant for attenuating optical signal. The weight ratio of Fe to Co is 1:0.23 when the V and the Co are simultaneously added. With respect to the optical signals with wavelengths 1310 nm and 1550 nm, the attenuation amount ratio is 1.01. In this embodiment, the wavelength characteristic of attenuation amount is also approximately flat.

Embodiment 4

In this embodiment, the optical fiber for attenuating optical signal is manufactured by using V and Cr serving as the dopant for attenuating optical signal. The weight ratio of V to Cr is 1:40 when the V and the Co are simultaneously added. With respect to the optical signals with wavelengths 1310 nm and 1550 nm, the attenuation amount ratio is 1.00. In this embodiment, the wavelength characteristic of attenuation amount is also approximately flat.

Embodiment 5

In this embodiment, the optical fiber for attenuating optical signal is manufactured by using Mn and Co serving as the dopant for attenuating optical signal. The weight ratio of Mn to Co is 1:0.04 when the V and the Co are simultaneously added. With respect to the optical signals with wavelengths 1310 nm and 1550 nm, the attenuation amount ratio is 1.06. In this embodiment, the wavelength characteristic of attenuation amount is also approximately flat.

Embodiment 6

In this embodiment, the optical fiber for attenuating optical signal is manufactured by using three kinds of elements of Mn, Ni and V serving as dopants for attenuating optical signal. The weight ratio of Mn to Ni to V is 1: 0.6:0.15 when they are simultaneously added. With respect to the optical signals with wavelengths 1310 nm, 1450 nm and 1550 nm, the attenuation amount ratio is 1:0.98:0.97. In this embodiment, the wavelength characteristic of attenuation amount is also approximately flat.

Embodiment 7

In this embodiment, the optical fiber for attenuating optical signal is manufactured by using three kinds of elements of Co, Fe and Ni serving as dopants for attenuating optical signal. The weight ratio of Co to Fe to Ni is 1: 33:2.7 when they are simultaneously added. With respect to the optical signals with wavelengths 1450 nm, 1550 nm and 1650 nm, the attenuation amount ratio is 1:0.95:0.95. In this embodiment, the wavelength characteristic of attenuation amount is also approximately flat.

Embodiment 8

In this embodiment, the optical fiber for attenuating optical signal is manufactured by using Fe in core and using Ni in cladding, serving as dopants for attenuating optical signal. In order to use the light escaping to the cladding and make the attenuation amounts of at least two kinds of optical signals with different wavelengths become same, in the cladding, the dopant is also doped near the core. The weight ratio of Fe to Ni is 1:0.49 when they are simultaneously added. With respect to the optical signals with wavelengths 1310 nm and 1550 nm, the attenuation amount ratio is 1:0.99. In this embodiment, the wavelength characteristic of attenuation amount is also approximately flat.

Embodiment 9

In this embodiment, the optical fiber for attenuating optical signal is manufactured by using Fe and V in cladding, serving as dopants for attenuating optical signal. That is, only the cladding serves as a doped area. The weight ratio of Fe to V is 1:0.36 when they are simultaneously added. With respect to the optical signals with wavelengths 1310 nm and 1550 nm, the attenuation amount ratio is 1.00. In this embodiment, the wavelength characteristic of attenuation amount is also approximately flat.

As an effect of the present invention, by using at least two kinds of dopants for attenuating optical signal, to be simultaneously added in optical fiber, it is possible to supply the optical fiber for attenuating optical signal enable the attenuation amount to become flat in wide wavelength scope.

The invention claimed is:

1. An optical fiber for attenuating an optical signal comprising a core and a cladding, wherein n ($n \geq 2$) kinds of dopants are included in the optical fiber for attenuating the optical signal, wherein the concentration $W_j$ (j=1, 2, 3, . . . , n) in weight % is adjusted, with respect to a wavelength $\lambda_i$ (i=1, 2, . . . , m; $m \geq 2$), to satisfy the following expressions 1 and 2;

$$0.9 < \frac{\alpha(\lambda_i)}{\alpha(\lambda_k)} < 1.1 \qquad \text{Expression 1}$$

$$\alpha(\lambda_i) = \sum_{j=1}^{n} W_j A_j(\lambda_i) \qquad \text{Expression 2}$$

wherein $\lambda_i$ is a wavelength of the optical signal,

α(λi) is an attenuation amount of the optical fiber for attenuating the optical signal with respect to the optical signal having the wavelength λi, K is a positive integral number, (K=1, 2, ..., m) and (k≠i), Wj is a concentration of dopant j, and Aj(λi) is an attenuation of the optical fiber for attenuating the optical signal with respect to the optical signal with wavelength λi and the attenuation Ai(λi) is produced by the dopant j of one unit.

2. The optical fiber for attenuating optical signal according to claim 1, wherein said dopants comprise at least two kinds of transitional metals selected from the group consisting of Co, Ni, Cr, V, Fe, Mn, Tb and Tm.

3. The optical fiber for attenuating optical signal according to claim 2, wherein said wavelength λi of optical signal is in a range of 1200–1700 nm.

4. The optical fiber for attenuating optical signal according to claim 3, wherein said wavelengths λi of optical signal are 1310 nm and 1550 nm.

5. The optical fiber for attenuating optical signal according to claim 3, wherein said fiber for attenuating optical signal, with respect to said wavelengths λi of optical signal, operates in single mode.

6. The optical fiber for attenuating optical signal according to claim 2, wherein said fiber for attenuating optical signal, with respect to said wavelengths λi of optical signal, operates in single mode.

7. The optical fiber for attenuating optical signal according to claim 2, wherein, in said doped area, the distribution of said dopant is not uniform along the radius direction of said optical fiber.

8. The optical fiber for attenuating optical signal according to claim 1, wherein said wavelength λi of optical signal is in a range of 1200–1700 nm.

9. The optical fiber for attenuating optical signal according to claim 8, wherein said wavelengths λi of optical signal are 1310 nm and 1550 nm.

10. The optical fiber for attenuating optical signal according to claim 1, wherein said fiber for attenuating optical signal, with respect to said wavelengths λi of optical signal, operates in single mode.

11. The optical fiber for attenuating optical signal according to claim 1, wherein, in said doped area, the distribution of said dopant is not uniform along the radius direction of said optical fiber.

12. An optical fiber for attenuating an optical signal comprising a core and a cladding, wherein n (n≧2) kinds of dopants are included in the optical fiber for attenuating the optical signal, wherein the concentration Wj (j=1, 2, 3, ..., n) in weight % is adjusted, with respect to a wavelength λi (i=1, 2, ..., m; m≧2), to satisfy the following expressions 1 and 2;

$$0.9 < \frac{\alpha(\lambda_i)}{\alpha(\lambda_k)} < 1.1 \qquad \text{Expression 1}$$

$$\alpha(\lambda_i) = \sum_{j=1}^{n} W_j A_j(\lambda_i) \qquad \text{Expression 2}$$

wherein λi is a wavelength of the optical signal,

α(λi) is an attenuation amount of the optical fiber for attenuating the optical signal with respect to the optical signal having the wavelength λi, K is a positive integral number, (K=1, 2, ..., m) and (k≠i), Wj is a concentration of dopant j, and Aj(λi) is an attenuation of the optical fiber for attenuating the optical signal with respect to the optical signal with wavelength Ai and the attenuation Aj(λi) is produced by the dopant j of one unit, said dopants comprise at least two kinds of transitional metals selected from the group consisting of Co, Ni, Cr, V, Fe, Mn, Tb and Tm, and wherein the doped area said dopant is doped in the cladding is about six times an area of the core around the core as a center.

13. An optical fiber for attenuating an optical signal comprising a core and a cladding, wherein n (n≧2) kinds of dopants are included in the optical fiber for attenuating the optical signal, wherein the concentration Wj (j=1, 2, 3, ..., n) in weight % is adjusted, with respect to a wavelength λi (i=1, 2, ..., m; m≧2), to satisfy the following expressions 1 and 2;

$$0.9 < \frac{\alpha(\lambda_i)}{\alpha(\lambda_k)} < 1.1 \qquad \text{Expression 1}$$

$$\alpha(\lambda_i) = \sum_{j=1}^{n} W_j A_j(\lambda_i) \qquad \text{Expression 2}$$

wherein λi is a wavelength of the optical signal,

α(λi) is an attenuation amount of the optical fiber for attenuating the optical signal with respect to the optical signal having the wavelength λi, K is a positive integral number, (K=1, 2, ..., m) and (k≠i), Wj is a concentration of dopant j, and Aj(λi) is an attenuation of the optical fiber for attenuating the optical signal with respect to the optical signal with wavelength Ai and the attenuation Aj(λi) is produced by the dopant j of one unit, said dopants comprise at least two kinds of transitional metals selected from the group consisting of Co, Ni, Cr, V, Fe, Mn, Tb and Tm, and wherein said dopants comprise a dopant enabling the absorption of optical signal to increase as the wavelength becomes longer and a dopant enabling the absorption of optical signal to decrease as the wavelength becomes longer that are simultaneously added.

14. An optical fiber for attenuating an optical signal comprising a core and a cladding, wherein n (n≧2) kinds of dopants are included in the optical fiber for attenuating the optical signal, wherein the concentration Wj (j=1, 2, 3, ..., n) in weight % is adjusted, with respect to a wavelength λi (i=1, 2, ..., m; m≧2), to satisfy the following expressions 1 and 2;

$$0.9 < \frac{\alpha(\lambda_i)}{\alpha(\lambda_k)} < 1.1 \qquad \text{Expression 1}$$

$$\alpha(\lambda_i) = \sum_{j=1}^{n} W_j A_j(\lambda_i) \qquad \text{Expression 2}$$

wherein λi is a wavelength of the optical signal,

α(λi) is an attenuation amount of the optical fiber for attenuating the optical signal with respect to the optical signal having the wavelength λi, K is a positive integral number, (K=1, 2, ..., m) and (k≠i), Wj is a concentration of dopant j, and Aj(λi) is an attenuation of the optical fiber for attenuating the optical signal with respect to the optical signal with wavelength λi and the attenuation Aj(λi) is produced by the dopant j of one unit, and wherein the doped area said dopant is doped in the cladding is about six times an area of the core around the core as a center.

15. The optical fiber for attenuating optical signal according to claim 14, wherein said wavelength λi of optical signal is in a range of 1200–1700 nm.

16. The optical fiber for attenuating optical signal according to claim 15, wherein said wavelengths Ai of optical signal are 1310 nm and 1550 nm.

17. The optical fiber for attenuating optical signal according to claim 16, wherein said fiber for attenuating optical signal, with respect to said wavelengths λi of optical signal, operates in single mode.

18. The optical fiber for attenuating optical signal according to claim 15, wherein said fiber for attenuating optical signal, with respect to said wavelengths λi of optical signal, operates in single mode.

19. The optical fiber for attenuating optical signal according to claim 14, wherein said fiber for attenuating optical signal, with respect to said wavelengths λi of optical signal, operates in single mode.

20. The optical fiber for attenuating optical signal according to claim 19, wherein said dopants are at least two kinds of transitional metals selected from the group consisting of Co, Ni, Cr, V, Fe, Mn, Tb and Tm.

21. The optical fiber for attenuating optical signal according to claim 14, wherein, in said doped area, the distribution of said dopant is not uniform along the radius direction of said optical fiber.

22. The optical fiber for attenuating optical signal according to claim 14, wherein, the dopants comprise a dopant enabling the absorption of optical signal to increase as the wavelength becomes longer and a dopant enabling the absorption of optical signal to decrease as the wavelength become longer, which are simultaneously added.

23. An optical fiber for attenuating an optical signal comprising a core and a cladding, wherein n (n≧2) kinds of dopants are included in the optical fiber for attenuating the optical signal, wherein the concentration Wj (j=1, 2, 3, . . . , n) in weight % is adjusted, with respect to a wavelength λi (i=1, 2, . . . , m; m≧2), to satisfy the following expressions 1 and 2;

$$0.9 < \frac{\alpha(\lambda_i)}{\alpha(\lambda_k)} < 1.1 \qquad \text{Expression 1}$$

$$\alpha(\lambda_i) = \sum_{j=1}^{n} W_j A_j(\lambda_i) \qquad \text{Expression 2}$$

wherein λi is a wavelength of the optical signal,

α(λi) is an attenuation amount of the optical fiber for attenuating the optical signal with respect to the optical signal having the wavelength λi, K is a positive integral number, (K=1, 2, . . . , m) and (k≠i), Wj is a concentration of dopant j, and Aj(λi) is an attenuation of the optical fiber for attenuating the optical signal with respect to the optical signal with wavelength Ai and the attenuation Aj(λi) is produced by the dopant j of one unit, and wherein said dopants comprise a dopant enabling the absorption of optical signal to increase as the wavelength becomes longer and a dopant enabling the absorption of optical signal to decrease as the wavelength becomes longer that are simultaneously added.

* * * * *